Patented Jan. 14, 1936

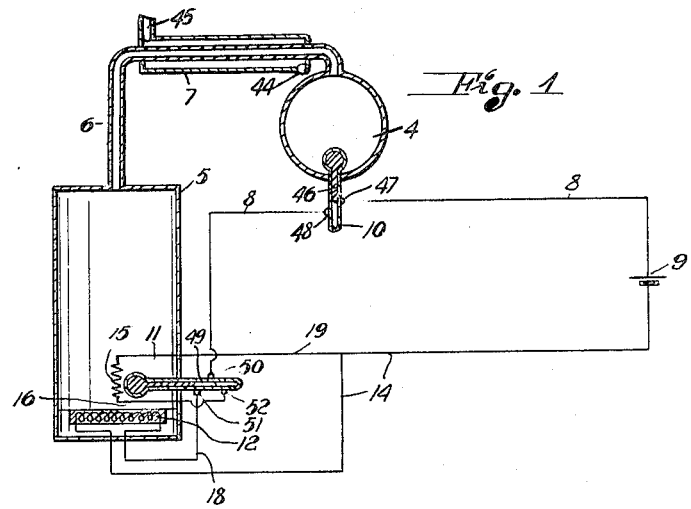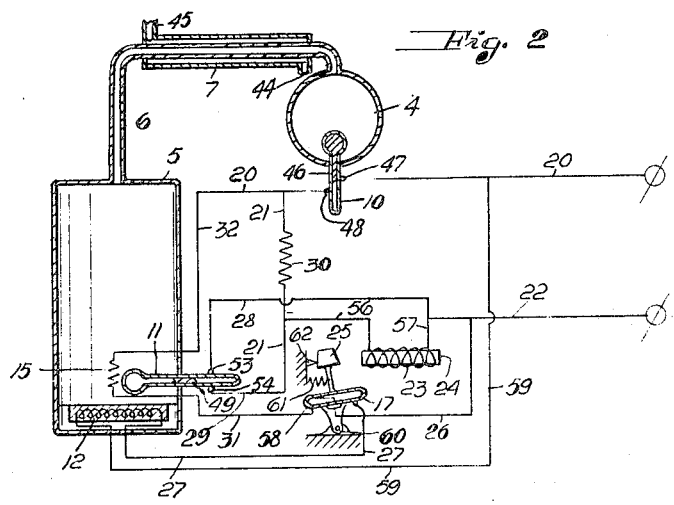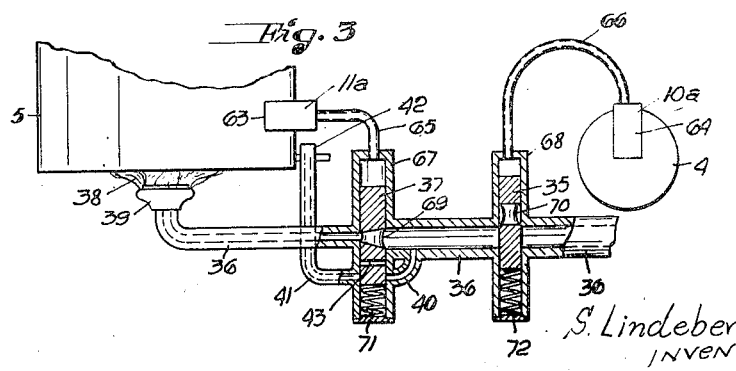

2,027,693

UNITED STATES PATENT OFFICE 2,027,693

DISCONTINUOUS ABSORPTION OR ADSORPTION COLD MACHINE

Stig Lindeberg, Stockholm, Sweden, assignor of one-half to Aktiebolaget Rimo, Stockholm, Sweden Application May 12, 1934, Serial No. 725,381
In Sweden May 15, 1933

5 Claims. (Cl. 62—5)

The invention is for improvements in and relating to discontinuous absorption or adsorption cold machines of the type in which a heating period is followed by a cold period, the cold period by a heating period and so on and which comprise a generator for driving off a cold medium, means for condensing the cold medium vapours, a refrigerator for evaporating the liquid cold medium and means for supplying heat to the generator during the heating period. The generator may also act as absorber or a separate absorber may be provided. It has already been suggested to provide means responsive to the temperature of the refrigerator for starting the heating period when the temperature of the refrigerator rises above a predetermined value and means responsive to the temperature of the generator for terminating the heating period when the temperature of the generator rises above a predetermined value. These means are interdependent on each other in such manner that heat is supplied to the generator only when permitted by both means, whereas each means by itself is effective for cutting off the supply of heat to the generator. Thus each of said means responsive to the temperatures of the refrigerator and the generator has an effective state in which it permits heat being supplied to the generator and an ineffective state in which it cuts off the supply of heat to the generator. The cycle of operations in such a machine is as follows.

When the temperature of the refrigerator rises above a certain value, i. e. when it becomes necessary to produce cold, the means responsive to the temperature of the refrigerator becomes effective for permitting heat being supplied to the generator. It is assumed that the means responsive to the temperature of the generator already is in a state which permits heat being supplied to the generator. The heating period thus begins and lasts until the temperature of the generator has reached a certain value when the means responsive to the temperature of the generator cuts off the supply of heat to the generator. Then the cold period begins and the liquid cold medium in the refrigerator evaporates and lowers the temperature of the refrigerator. This cold period should then go on until the temperature of the refrigerator drops below a certain value when the means responsive to the temperature of the refrigerator again becomes ineffective and no longer admits heat to the generator until the temperature of the refrigerator has again risen above a certain value. However, when the cold period is commenced the temperature of the generator also begins to fall and if the means responsive to the temperature of the generator should become effective for admitting heat to the generator before the supply of heat has been cut off by the means responsive to the temperature of the refrigerator, then a new heating period is started before the cold period is at an end.

The invention has for its object to avoid this difficulty by providing means operative to prevent the said means responsive to the temperature of the generator from starting a heating period, after a cold period has commenced, until started by the said means responsive to the temperature of the refrigerator.

The annexed drawing shows some forms of embodiment of an arrangement according to this invention.

In the drawing Fig. 1 shows diagrammatically one form having electrical heating means for the generator. Fig. 2 shows a modification of the arrangement according to Fig. 1. Fig. 3 shows diagrammatically a third form of embodiment, in which the generator is heated by means of gas, oil or another fluid.

Referring to Fig. 1, 4 designates the refrigerator and 5 the generator, which latter may be combined with the absorber into one unit. The said two containers 4 and 5 are in communication with each other by means of a pipe conduit 6 provided with a condenser 7 in known manner, said condenser having an inlet 44 and an outlet 45 for a cooling medium such as water. Provided in the refrigerator 4 is a thermostat, a temperature relay or some other member 10 of the well known type responsive to the temperature of the refrigerator. Provided in the generator there is a second thermostat 11 responsive to the temperature of the generator and of a type similar to the member 10. In the form of embodiment shown the thermostat 10 is of the well known thermometer type having a movable mercury column 46 adapted to electrically connect two contacts 47 and 48. The thermostat 11 contains an expansive medium such as for instance hydrocarbon and a mercury body 49 moved by said expansive medium and adapted to connect a contact 50 with either one of two contacts 51 and 52, respectively.

The contacts 47, 48, 50 and 51 form part of an electric circuit 8, 18, 14 containing a source of current 9 and adapted to supply electric energy to a heating element 12 within the generator 5, whereas the contacts 47, 48, 50 and 52 form part of an electric circuit 8, 16, 19, 14 containing the same source of current 9 as the above mentioned circuit 8, 18, 14 and besides a heating member 15 located close to the thermostat 11 and adapted to heat said thermostat as will be more clearly described below.

The thermostat 10 is adapted to break the heating circuit 8, 18, 12, 14 at the contacts 47, 48 at or about at a temperature of plus 5° C. of the refrigerator, while the thermostat 11 is adapted to break the said circuit at the contacts 50, 51 at the end of the boiling period, for instance at a temperature of about 65–115–130° C. or at a higher temperature of the generator.

Upon a boiling period there follows a cold producing period, and it may be assumed that a cold period is at hand and that the temperature of the refrigerator is below plus 5° C. At this temperature the heating circuit 8, 18, 12, 14 is broken at the contacts 47, 48 as indicated in the figure. At the same time the temperature of the generator is also relatively low, and as a consequence the heating circuit is closed at the contacts 50 and 51 as also indicated in Fig. 1.

At the end of the cold producing period the temperature of the refrigerator begins to rise and when reaching the predetermined value of plus 5° C. the thermostat 10 closes the circuit at the contacts 47, 48 by the aid of the mercury column 46, and the heating element 12 will be cut in, thereby starting a new boiling period. At the end of this latter period, i. e. when the temperature of the generator has reached any of the above predetermined values, the mercury body 49 will due to the expansion of the expansive medium be moved outwards and break the heating circuit at the contact 51. Upon this a new cold producing period follows.

Since during the cold producing period the temperature of the generator 4 drops rather rapidly, it may happen that the thermostat 11 will close the heating circuit at the contacts 50, 51 at an early part of the cold producing period, i. e. before the thermostat 10 has broken the said circuit at the contacts 47, 48, which would result in that a boiling period would arise, before the cold producing period is at an end, such an action being obviously very objectionable.

This drawback is avoided according to the present invention by cutting in the auxiliary heating member 15, which will, irrespective of the drop of temperature of the generator, maintain the temperature of the thermostat 11 at such a value which will prevent the mercury body 49 of reestablishing the main heating circuit 8, 18, 14 at the contacts 50, 51, before the cold producing period is at an end.

The cutting in of the said heating member 15 takes place at the end of the boiling period by the mercury body 49, which when leaving the contact 51, connects the contacts 50 and 52 and thereby establishes the auxiliary heating circuit 8, 16, 19 and 14 containing the heating member 15. This circuit is controlled solely by the thermostat 10 of the refrigerator 4 and will not be broken, before the cold producing period is at an end as described above, i. e. when the temperatures of the refrigerator is below plus 5° C. When thus cutting out the heating member 15 the temperature of the thermostat 11 drops and the mercury body 49 is moved back due to the contraction of the expansive medium and reestablishes the main heating circuit at the contacts 50 and 51. Upon the following closing of the contacts 47 and 48 at the thermostat 10 at the end of the cold producing period, i. e. when the temperature of the refrigerator 4 has risen to about plus 5° C., a new boiling period will start, followed by a new cold producing period and so on, it being effectively secured that a new boiling period will not take place before the preceding cold producing period is brought to an end.

Fig. 2 shows a somewhat modified arrangement. In this figure, as in Fig. 1, 4 designates the refrigerator, 5 the generator, 6 the pipe conduit connecting the generator and the refrigerator with each other, 7 the condenser having the inlet 44 and the outlet 45 for a cooling medium, 10 the thermostat responsive to the temperature of the refrigerator, 11 the thermostat responsive to the temperature of the generator and 12 the heating element of the generator. The thermostats 10 and 11 are shown to be of the same type as those according to Fig. 1, but may of course as the latter be of any other known type.

In this form of embodiment the circuit of the heating element 12 of the generator 5 is not directly controlled by the thermostats 10 and 11, but indirectly by means of a servomotor of the type comprising an electromagnet as will be described below.

The contacts 47 and 48 of the thermostat 10 form part of an electric circuit 20, 21, 56, 57 and 22 containing the energizing coil 23 of an electromagnet 24, the armature 25 of which is carried by a tube 17 containing a mercury body 58. The tube 17 with the mercury body 58, which forms a circuit breaker of known type, is tiltable together with the armature 25 about a stationary pin 60, the mercury body then moving from the one end of the tube to the other in known manner.

Further, the contacts 47 and 48 of the thermostat 10 form part of an electric circuit 20, 32, 31, 58, 26 and 22 containing the auxiliary heating member 15 for the thermostat 11 responsive to the temperature of the generator 5.

The contacts 53 and 54 of said latter thermostat 11 form part of an electric circuit 20, 21, 28 and 22 containing a resistance 30 of about 7000 ohm or more and controlled by the movable mercury body 49 and also by the mercury column 46 of the thermostat 10. The heating element 12 of the generator 5 is contained in a circuit 59, 27, 26 and 22 controlled by the mercury circuit breaker 17, 58.

It may again be assumed that a cold producing period prevails, and that the temperature of the refrigerator 4 is below plus 5° C. In this case all of the above mentioned circuits controlled by the thermostat 10 are broken, the armature 25 and the circuit breaker 17, 58 obtain the position shown in the figure and also the circuit of the heating element 12 is broken at 26, 27. The temperature of the generator 5 is also comparatively low and the mercury body 49 of the thermostat 11 makes no contact at 53 and 54. The cold producing period is going on.

When at the end of the said period the temperature of the refrigerator rises to the predetermined value of plus 5° C. the mercury column 46 of the thermostat 10 makes contact at 47, 48 and closes the circuit 20, 21, 56, 57 and 22 of the magnet coil 23. The electromagnet 24 is energized and attracts its armature 25, thereby causing the mercury circuit breaker 17, 58 to tilt, so that the mercury body 58 connects the conductors 26 and 27. As a consequence the circuit 59, 27, 26 and 22 of the heating element 12 is closed and a boiling period starts.

At the end of said latter period, when the temperature of the generator 5 has risen to the predetermined value of for instance 115° C., the mercury body 49 of the thermostat 11 makes contact at 53, 54, thereby closing the circuit 20, 21, 28 and 22 containing the high resistance 30. Simultaneously with the closing of the said circuit the circuit 20, 21, 56, 57 of the magnet coil 23 will be short-circuited, and as a consequence the electromagnet 24 will be disenergized, resulting in that the armature 25 and the tube 17 will be tilted to the position shown in the figure, for instance through the action of a spring 61 as shown, said movement being limited by an abutment 62. In this position of the tube 17 the circuit 20, 32, 31, 58, 26 and 22 of the auxiliary heating member 15 will be closed, and the temperature of the thermostat 11 will, irrespective of the drop of temperature of the generator at the beginning cold producing period, be maintained at a value sufficient to keep the mercury body 49 in contact with the contacts 53 and 54 and thus to maintain the short-circuiting of the electromagnet circuit, so that the heating element 12 of the generator 5 cannot be cut in and a new boiling period cannot start. This condition lasts, until the circuit of the heating member 15 is broken by the thermostat 10 at the contacts 47, 48, whereupon the mercury body 49 of the thermostat 11 will due to the low temperature of the generator return to the position shown in the figure and break off the short-circuiting of the magnet coil 23, so that a new boiling period can begin, when the cold producing period is at an end and the circuit of the said coil is again closed at the contacts 47, 48 of the thermostat 10. During the short-circuiting period of the magnet coil 23 the energy in the circuit 20, 21, 54, 49, 53, 28 and 22 is accumulated by the resistance 30, which is sufficient for the relatively short time, until the current is broken by the thermostat 10.

According to the above form of embodiment the heating current does not pass through the thermostats, and the current, which passes through the thermostats and serves only as a manoeuvring current for a servomotor such as the electromagnet, may be of a lower voltage than the heating current. The auxiliary heating member 15 may have a very small capacity, so that the heat delivered by the same will have no essential influence on the course of the cold producing period.

Fig. 3 illustrates a form of embodiment, wherein the heating of the generator 5 is brought about by the aid of a fluid, such as gas, oil or any other heating fluid. The said fluid is conducted to the generator 5 through a conduit 36 having a suitable burner 39 for generating a flame 38. The generator is provided with a suitable thermostat 11a responsive to the temperature of the generator, and similarly the refrigerator 4 is provided with a thermostat 10a responsive to the temperature of the refrigerator. The said thermostats comprise containers 63 and 64, respectively, for an expansive medium such as for instance hydrocarbon or a liquid or the like, the containers being connected by means of pipes 65 and 66, respectively, with the interior of valve casings 67 and 68 secured to the fluid conduit 36 and having valve bodies 37 and 35, respectively, movable therein. The valve bodies 37 and 35 are provided with ports 69 and 70, respectively, controlling the passage of the fluid through the conduit 36. The valve bodies are moved in the one direction (downwards) by the action of the expansive medium in the thermostats at certain temperatures of the generator 5 and the refrigerator 4 and are moved in the other direction (upwards) by the action of springs 71 and 72, respectively. The valve 37 is shown in open position and is moved to this position by the spring 71, whereas the valve 35 is shown in closed position and is moved to such position by the action of its spring 72. Thus, the expansive medium in the thermostat 11a tends to close the valve 37, whereas the expansive medium in the thermostat 10a tends to open the valve 35. In the lower part of the valve body 37 there is provided a second port or channel 43 adapted to bring about a communication between a branch pipe 40 and a pipe 41 having a small auxiliary burner 42 for heating the thermostat 11a, when the valve body 37 is in its closed position, in order to maintain the said valve body in such position also after the end of a boiling period. The thermostats 10a and 11a are assumed to operate at the temperature limits mentioned above in connection with the embodiments according to Figs. 1 and 2.

It may now again be supposed that a cold producing period is going on and that the temperature of the refrigerator 4 is below plus 5° C. In this case the valve 35 is held in its closed position as shown by means of its spring 72, the thermostat 10a being out of action. Also the thermostat 11a is out of action, and the valve 35 is held in its open position by means of the spring 71. At the end of the cold producing period the temperature of the refrigerator begins to rise and when reaching the predetermined value of plus 5° C. the thermostat 10a is brought into action, the expansive medium therein acting on the valve body 35 and moving it to the open position against the action of the spring 72. In this position the fluid is free to pass to the main burner 39, and a boiling period starts.

At the end of this period, when the temperature of the generator has reached the predetermined value of say for instance 115° C., the thermostat 11a is brought into action and closes the valve 37 against the action of the spring 71. Thus, the passage of the fluid is shut off and the boiling period ceases, which results in that the temperature of the generator drops, a new cold producing period being now started. At the closing of the valve 37 the channel 43 is brought to register with the openings of the pipes 40 and 41, and the fluid is delivered to the auxiliary burner 42, which will, irrespective of the drop of temperature of the generator, maintain the temperature of the thermostat 11a at such a value that the pressure of the expansive medium keeps the value 37 in its closed position. At the end of the cold producing period, when the temperature of the refrigerator is below plus 5° C., the expansive medium in the thermostat 10a is contracted, the valve 35 returns to its closed position under the action of the spring 72 and shuts off the supply of fluid also to the auxiliary burner 42, so that the action of the thermostat 11a ceases. Then the valve 37 is returned to its open position under the action of the spring 71, and a new boiling period will start, when at the predetermined temperature of the refrigerator 4 the valve 35 is again brought to the open position.

In all of the forms of embodiment shown and described the beginning of a boiling period is controlled under all conditions by the thermostat 10 or 10a in accordance with the temperature prevailing in the refrigerator 4.

Ordinary thermostats or any other members responsive to variations of the temperature may be used for controlling the supply of heating medium. The said members may actuate the regulating means for the heating medium by the aid of an auxiliary electric current when using an electric heating current as well as gas or other fluid. Further, the expansive medium of the thermostat, when using such types of thermostats need not directly actuate the regulating means of the heating medium or the auxiliary current. For instance in thermostats according to Fig. 3 the expansive medium may displace a piston or act upon a diaphragm, the movement of which is utilized for adjusting the regulating means. The fluid supplied through the conduit 36 may instead of a burnable gas consist of a hot liquid or gas, which gives off its heat to the generator and the thermostat.

Further, the invention is not dependent upon the constructive details of the cold producing machine and thus is independent of the means for cooling the absorber. The absorber and the generator, which may be placed adjacent to each other or combined into a common generator-absorber, may thus be combined with any system for cooling with air or liquid. Further the two thermostats may obviously be located at other places than in the refrigerator and the generator, respectively, if they are but made responsive to the temperature of said parts. The thermostat responsive to the temperature of the refrigerator may therefore be placed in the cold chamber or in conduits leading from or to the refrigerator. In cold machines heated by oil through a wick burner the wick or the flame may be acted on by the thermostats or the latter may directly actuate a rack in accordance with the arrangement, by means of which the displaceable valves in Fig. 3 are actuated through the thermostats.

What I claim as new and desire to secure by Letters Patent of the United States of America is:—

1. Discontinuous absorption or adsorption cold machine of the type in which a heating period is followed by a cold period, the cold period by a heating period and so on, including a generator for driving off a cold medium, means for condensing the cold medium vapours, a refrigerator for evaporating the liquid cold medium, means for supplying heat to the generator, means operative responsive to the temperature of the refrigerator to start a heating period when the temperature of the refrigerator rises above a predetermined value, means operative responsive to the temperature of the generator to terminate the heating period when the temperature of the generator rises above a predetermined value and auxiliary heating means operative to prevent the said means responsive to the temperature of the generator from starting a heating period, after a cold period has commenced, until started by the said means responsive to the temperature of the refrigerator.

2. Discontinuous absorption or adsorption cold machine of the type in which a heating period is followed by a cold period, the cold period by a heating period and so on, including a generator for driving off a cold medium, means for condensing the cold medium vapours, a refrigerator for evaporating the liquid cold medium, means for supplying heat to the generator, means responsive to the temperature of the refrigerator and operative to permit heat being supplied to the generator above a predetermined temperature of the refrigerator and to cut off the supply of heat to the generator below a predetermined temperature of the refrigerator, means responsive to the temperature of the generator and operative to cut off the supply of heat to the generator above a predetermined temperature of the generator and auxiliary heating means operative to delay the action of the last mentioned means in again becoming effective for permitting heat being supplied to the generator.

3. Discontinuous absorption or adsorption cold machine of the type in which a heating period is followed by a cold period, the cold period by a heating period and so on, including a generator for driving off a cold medium, means for condensing the cold medium vapours, a refrigerator for evaporating the liquid cold medium, means for supplying heat to the generator, means responsive to the temperature of the refrigerator and operative to permit heat being supplied to the generator above a predetermined temperature of the refrigerator and to cut off the supply of heat to the generator below a predetermined temperature of the refrigerator, means responsive to the temperature of the generator and operative to cut off the supply of heat to the generator above a predetermined temperature of the generator and auxiliary heating means operative to delay the action of the last mentioned means in again becoming effective for permitting heat being supplied to the generator substantially until the said means responsive to the temperature of the refrigerator have cut off the supply of heat to the generator.

4. Discontinuous absorption or adsorption cold machine, including a generator for driving off a cold medium, means for condensing the cold medium vapours, a refrigerator for evaporating the liquid cold medium, means for supplying heat to the generator, means for controlling the supply of heat to the generator, one responsive to the temperature of the refrigerator and one responsive to the temperature of the generator and auxiliary heating means for counteracting the responsiveness of the last mentioned means to the temperature of the generator at the beginning of the cold period.

5. Discontinuous absorption or adsorption cold machine of the type in which a heating period is followed by a cold period, the cold period by a heating period and so on, including a generator for driving off a cold medium, means for condensing the cold medium vapours, a refrigerator for evaporating the liquid cold medium, means for supplying heat to the generator, means operative responsive to the temperature of the refrigerator to turn on the supply of heat to the generator when the temperature of the refrigerator rises above a predetermined value, means operative responsive to the temperature of the generator to cut off the supply of heat to the generator when the temperature thereof rises above a predetermined value, each of said means responsive to the temperatures of the refrigerator and the generator having a state in which it permits heat being supplied to the generator and a state in which it prevents heat being supplied to the generator, and auxiliary heating means for said means responsive to the temperature of the generator operative after the supply of heat to the generator has been cut off by said latter means at the end of the heating period to maintain the temperature of said means responsive to the temperature of the generator at the beginning of the cold period and delay its action in again becoming effective for permitting heat being supplied to the generator.

STIG LINDEBERG.